United States Patent

[11] 3,601,458

[72] Inventors: Ronald J. Farrell, Bremen; Allen Kerns, Valparaiso; Carl R. Ernsberger, Bremen, all of, Ind.
[21] Appl. No.: 873,452
[22] Filed: Nov. 3, 1969
[45] Patented: Aug. 24, 1971
[73] Assignee: SRF Industries, Inc. King of Prussia, Pa.

[54] DRAWN CROWNED BEARING SHELL
5 Claims, 6 Drawing Figs.

[52] U.S. Cl. .................................................. 308/212
[51] Int. Cl. .................................................. F16c 13/00
[50] Field of Search ....................................... 308/212, 217

[56] References Cited
UNITED STATES PATENTS
3,248,155  4/1966  Schaeffler .................. 308/212

Primary Examiner—Martin P. Schwadron
Assistant Examiner—Frank Susko
Attorney—Howson and Howson ABSTRACT: A needle roller bearing assembly adapted to be mounted on a shaft member or the like comprising a plurality of rolling elements, a cage having a plurality of pockets for circumferentially spacing the rolling elements and an outer casing having a circumferentially extending inner raceway, said casing including at least one inwardly directed flange at one axial end which is of reduced cross section and folded 180° on itself and disposed at an inwardly directed angle relative to a true radial plane.

PATENTED AUG24 1971
3,601,458
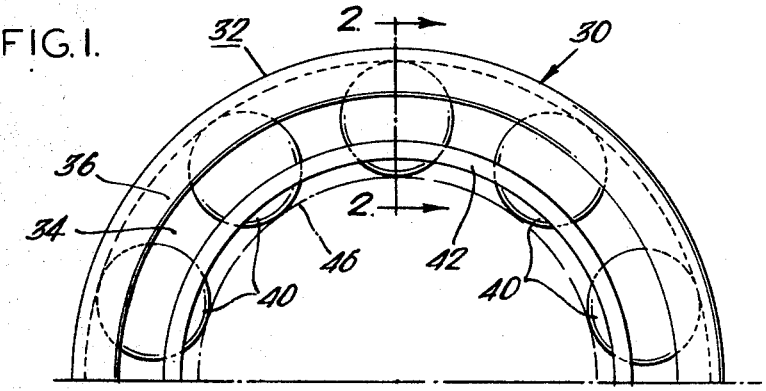
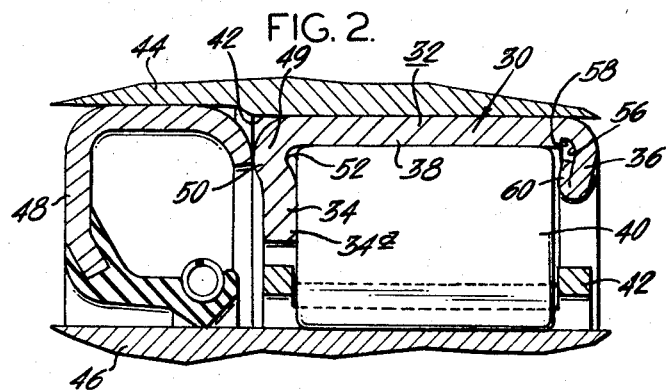
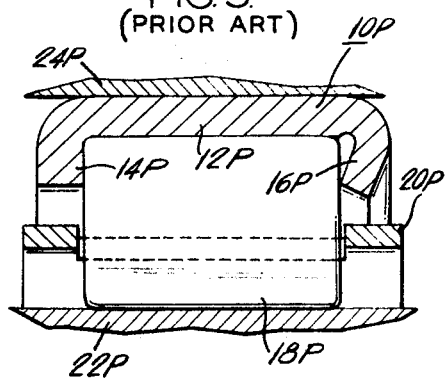
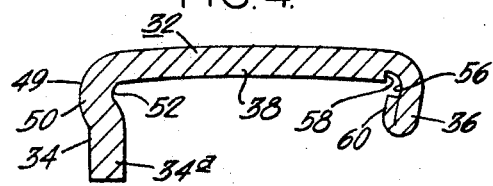
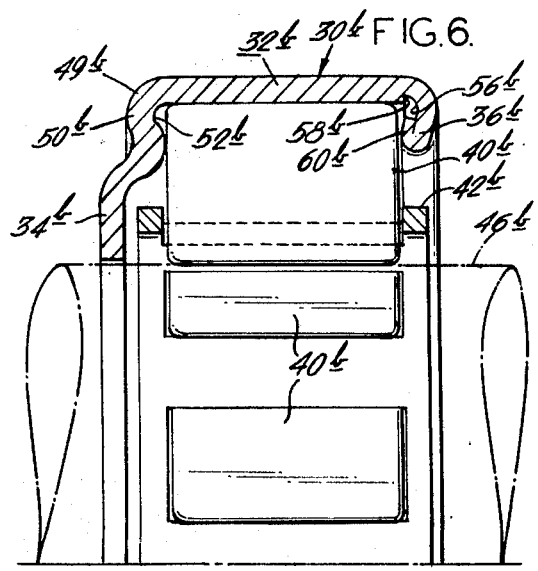
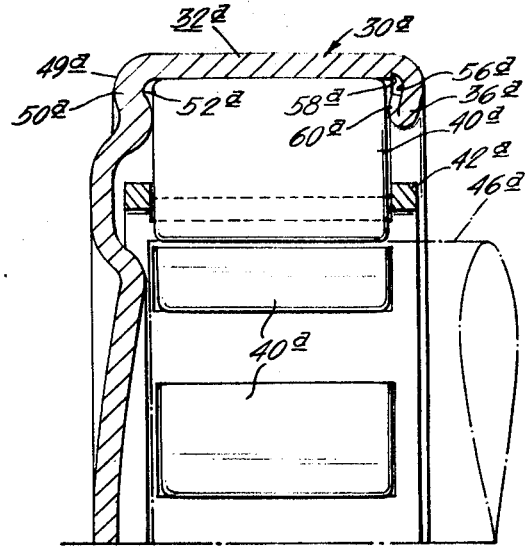
INVENTORS:
RONALD J. FARRELL
ALLEN KERNS
CARL R. ERNSBERGER
BY Howson & Howson
ATTYS.

DRAWN CROWNED BEARING SHELL

The present invention relates to a new and improved bearing assembly and more particularly to an improved type of needle roller bearing.

Most needle bearing assemblies generally comprise an outer cup or shell having a pair of circumferentially extending radially inwardly directed flanges at opposite axial ends which confine a plurality of barrel-shaped rollers against axial displacement and a retainer for circumferentially spacing the rollers. These assemblies are generally mounted in a housing with the rollers directly engaging a shaft member or the like, the shell usually being of a size or dimension so that it is press fitted in the housing. A typical prior art bearing assembly is shown in FIG. 3 of the drawings. As illustrated therein, one of the flanges at the bottom of the cup is formed prior to assembly of the rolling elements and the other flange is bent inwardly after the rollers have been assembled in the cup. By this method a minimum corner radius is required on the pressing punch which not only weakens the shell in the corner area as a result of the stamping process, but it is also necessary to manufacture the rollers with a minimum corner radius that was larger than the maximum expected radius of the inside of the shell. This latter provision eliminates possible wedging of the roller due to the contact of the roller corner and the internal corner radius of the cup. Thus, the capacity of the assembly is reduced due to the reduction in the effective roller contact length resulting from the use of a large roller corner radius. Furthermore, it has been found that this is a problem area as far as lubrication, for the simple reason that the interior periphery of the shell conforms closely to the roller configuration and has the effect of breaking down the lubrication in this corner.

Another problem in assemblies of this type is the fact that the flange at the opposite end of the shell which is bent inwardly after assembly of the rollers presents a sharp edge to the axial end face of the rollers which may cause damage thereto during operation. Further, during the folding operation in the closing die a sharp edge is presented which scrapes the forming curve of the closing die thereby necessitating frequent redressing or premature replacement of the die.

In assemblies of this type, the central section of the shell usually has a straight-sided outer peripheral wall, and it has been found that during water or oil quenching in the heat treating process, the unsupported metallic structure tends to shrink. In the case of the bearing shells, the greatest shrinkage is between the end rings or flanges causing an unhardened shell with straight sides to take an hourglass shape after being heat treated. Thus, when the shell is press fitted in the housing the support or pressure on the shell is localized and not spread over the full length of the shell. This, of course, does not provide the most effective gripping or anchoring action for the bearing assembly. With the foregoing in mind, an object of the present invention is to provide an improved rolling bearing of the above type which overcomes the disadvantages of the prior art discussed above. To this end the cup or shell of the bearing of the present invention has specially formed end flanges. For example, the flange at the bottom of the cup formed by the stamping operation is in the form of an ogee curve which defines a circumferentially extending channel or passageway at the corner of the rollers. This provides an area for either grease lubricant storage in pregreased bearings or in the case of oil lubrication, a channel for the lubricant to flow caused by the action of the rollers in their peripheral route within the shell. This arrangement not only provides a steady flow of fresh lubricant to the load zone should it be above the normal level of the lubricant, but also to the ends or load areas of the rollers where it is needed most. This flange configuration is also easier to form in a stamping operation and by reason of the curved configuration the flange functions as a spacer to insure that the roller cage will be contained within the envelope dimensions of the bearing. This prevents cage wear and possible damage resulting from contact between the cage and machine members adjacent the bearing.

Another advantage of this ogee flange shape of the present invention is that rollers having a smaller corner radius may be used because the danger of roller contact with the flange radius is eliminated. This results in a greater roller effective length which in turn provides higher dynamic capacity and longer bearing fatigue life. For example, a roller having an overall length of 0.4800 inch would require a mean corner radius of 0.0375 inch when used with a cup of the prior art-type described. This would leave a mean effective length of 0.4800−2X.=0.405 inch. With the cup of the present invention, a mean roller corner radius of 0.0175 inch may be used, which gives a greater mean effective length of 0.445 inch, a 10 percent increase. Bearing fatigue life is proportional to roller effective length taken to the 2.59 power. Therefore, in the present example the 10 percent roller length increase results in a fatigue life increase of 33 percent for the bearing.

Another feature of the present invention is the configuration and arrangement of the folded flange at the opposite end of the shell. In the present instance, the wall of the flange initially is of thinner cross section than the body of the shell and when the return lip is folded 180° upon itself the total thickness of the flange is equal to or greater than the shell thickness in the roller engaging area. This is necessary not only to guide and properly locate the rollers in the finished bearing but also strengthens the shell at this point and provides a smooth flange inner edge which is less susceptible to cracking during the folding operation and further provides an edge that is free from burrs. This arrangement has the further advantage of presenting a curved surface to the closing die thereby minimizing the chance of damage and extending the life of the die.

Another feature is the provision of a crowned central shell portion which is preferably of a height to maintain a very slight rise for example in the order of 0.001 inch per side. By this arrangement as the shell is pressed into a housing, the flanges will develop compressive stresses on it and the interior wall of the shell thereby creating the most desirable metallic structure to extend the life of the bearing. The induced compressive forces will also act to develop an outwardly directed pressure on the housing more evenly over its full length. The increased outward pressure thereby obtained not only guarantees a better anchor for the bearing in the housing, but also assures that the shell wall is fully supported by the backup material over its full length and that the shell is gripping the supporting wall with an even pressure from end to end rather than gripping only at the flanges as might be expected with an hourglass shell.

These and other objects of the present invention and the various features and details of the operation and construction thereof are hereinafter more fully set forth with reference to the accompanying drawings wherein:

FIG. 1 is a partial side elevational view of a needle roller bearing assembly in accordance with the present invention;

FIG. 2 is an enlarged sectional view taken on lines 2—2 of FIG. 1;

FIG. 3 3 is a transverse sectional view through a needle roller bearing of conventional form;

FIG. 4 is a transverse sectional view taken through the shell of the needle roller bearing assembly;

FIG. 5 is a fragmentary sectional view of a modified form of needle roller bearing assembly in accordance with the present invention; and FIG. 6 is a still further modified form of needle roller bearing assembly in accordance with the present invention.

Referring now to the drawing, there is illustrated in FIG. 3 a typical needle roller bearing assembly of the prior art-type. This assembly includes an outer shell generally designated by the numeral 10P having a central body portion 12P, a radially inwardly directed flange 14P at the bottom of the shell, and a radially inwardly directed flange 16P at its opposite end which is inwardly directed at an angle relative to a radial plane. The assembly further includes a plurality of needle rollers 18P and a retainer 20P which as is conventional has a plurality of circumferentially spaced window openings to locate the rollers uniformly around the periphery of the shell. This assembly as illustrated is adapted to be mounted on a shaft 22P and the shell pressed in a housing 24P. The rollers as illustrated ride directly on the shaft and the shell is of a slightly larger diameter than the bore in the housing to provide a press fit. This construction has presented certain problems in operation of the bearing and also assembly thereof. As is conventional, the shell is initially formed by a stamping operation to form the flange 14P at the bottom of the cup. Thereafter, the rollers are inserted and the flange 16P bent inwardly by a conventional so-called closing die operation.

The present invention is designed to provide an improvement in needle roller bearings of the above type. The needle roller bearing of the present invention which is generally designated by the numeral 30 comprises the same basic elements as the prior art bearing, that is, a shell or cup 32 having radially inwardly directed flanges 34 and 36 at opposite axial ends of the body portion 38 of the shell, a plurality of rollers 40, and a retainer 42 for circumferentially spacing the rollers in the shell. This assembly is adapted to be mounted in the bore 42 of a housing 44 so that the rollers ride on a shaft or the like 46. In the present instance the assembly may include a seal 48 of conventional form at the outer axial end of the bore in the housing.

One of the features of the needle roller bearing assembly of the present invention is the configuration and formation of the bottom flange 34. As best illustrated in FIG. 2, the flange which is integral with the body portion of the cup has an ogee curve configuration as at 49 formed during the stamping operation. More specifically, the juncture of the flange and body portion is curved outwardly as at 50 to define a circumferential channel 52 and the lower terminal edge of the flange 34a returns to extend radially. By this arrangement there is clearance for the roller edge whether the roller corner is sharp edged or has a radius. This contrasts with previous methods which required a minimum corner radius on the pressing punch which not only weakens the shell in this area as a result of the stamping process necessitating frequent redressing of the punch, but required also that the roller be manufactured with a corner radius that was larger than the maximum expected radius on the inside of the shell thereby reducing the effective length of the roller. This, of course, reduced the capacity of the bearing. Further, by this configuration the gently curved section 52 permits a radius of curvature that is more compatible to heavier metal pressing and has the added advantage of structurally strengthening the flange by virtue of the double bend through the use of larger, smoother transitional fillets. Consequently, the metal can be of a width to provide an overhang in the axial direction whereby the retainer 42 is contained within the envelope dimensions of the bearing. Moreover, as noted previously the channel 52 provides a storage area for grease in pregreased bearings or, in the case of oil lubrication, insures a constant flow by reason of the pumping action during operation of the bearing. This insures not only a steady flow of fresh lubricant to the load zone should it be above the normal level of the lubricant, but also to the ends or load areas of the rollers where it is needed most.

Another feature of the present invention is the configuration of the flange 36 at the opposite end of the shell which is formed to provide a circumferentially extending channel 56 similar to the channel 52. In the present instance this is accomplished by the wall of the flange being of reduced cross section as illustrated to form a shoulder 58 at the channel 56 and reverse bending the return lip 60, 180° upon itself so that the total thickness of the flange is equal to or greater than the shell thickness in the roller path area. The return lip feature therefore not only develops the proper thickness required to guide and properly locate the rollers in the finished bearing but also strengthens the flange at this point and provides a smooth flange I.D. which is less susceptible to cracking during the folding operation and further provides a flange I.D. that is free from burrs. In the folded position, the return lip inner surface presented to the ends of the roller is also smoother and wider than the unfolded edge of a plain stamped cup. The void produced between the return lip and the inside radius of the corner bend has the same effect of clearing the corner radius on the roller and provides the same type of lubrication channel as that found on the stamped end of the shell. One more advantage of the return lip on the open end of the shell is to present a curved surface to the closing die rather than the normally found sharp edge at this point on an open cup which would scrape the forming curve of the closing die which would require frequent redressing or early replacement of the die.

As best illustrated in FIG. 4, the body portion 38 of the cup is slightly crowned so that the cup is barrel-shaped in the unhardened state. This may be produced by rolling of the shell after stamping, or it may be done in a pressing operation. With the shell in this form, it is then water or oil quenched in a heat treating process whereby there is shrinkage between the end flanges which in the case of the prior art shells produced an hourglass shape after heat treatment. By crowning the shell the problem of distortion is obviated and it has been found that after heat treating the shell is rounder. Further, the flattening of the arch between the flanges develops compressive stresses thereby creating the most desirable metallic structure to extend the life of the bearing. Induced compressive forces will also act to develop an outwardly directed pressure on the housing after assembly to more evenly distribute the pressure on the shell over its entire length. This increased outward pressure thereby obtained not only guarantees a better anchor for the bearing in its housing, but assures that the shell wall is fully supported by the backup material over its full length and that the shell is gripping the supporting wall with an even pressure from end to end rather than gripping only at the flanges as might be expected with an hourglass shell. It is noted that the shell straightens out when it is installed and conforms to the straight sides of the bore of the housing and it therefore in no way obviates the advantages of a crowned roller providing only an outer diameter surface which is positively backed up by the housing into which it is pressed.

FIG. 5 shows a modified form of the bearing assembly described above. The various elements of the assembly which are identical to those described above bear the same reference numerals with the suffix "a" added. In the present instance the cup 32a is similar to the overall configuration in regard to the channel configuration at opposite ends. However, in the present instance the bottom flange entirely closes the bearing assembly and is formed to define a circumferentially extending chamber for the retainer.

FIG. 6 is a further modification of the basic bearing assembly illustrated and described above and again the parts which are identical are given the same reference numeral with the suffix "b " added. In the present instance the bottom flange 34b is extended to circumscribe the retainer and terminate just short of the circumferential trace of the shaft.

We claim:

1. A needle roller bearing assembly adapted to be mounted on a shaft member or the like comprising a plurality of rolling elements, a cage having a plurality of pockets for circumferentially spacing the rolling elements and an outer casing having a circumferentially extending inner raceway, said casing including a body portion having at least one inwardly directed flange at one axial end which is of reduced cross section and folded 180° on itself and disposed at an inwardly directed angle relative to a true radial plane.

2. A rolling bearing assembly as claimed in claim 1 including a second radial flange extending inwardly from the opposite axial end of the body portion having an ogee curved configuration, said cured configuration being formed at the juncture of the flange and body portion by an outwardly curved section defining a circumferentially extending channel spaced to one side of a radial line within which the inner face of the said one flange lies.

3. A rolling bearing assembly as claimed in claim 1 wherein said body portion is slightly crowned so that the cup is bowl-shaped in the unhardened state.

4. A rolling bearing assembly as claimed in claim 1 wherein said one flange completely encloses the one end of the bearing.

5. A rolling bearing assembly as claimed in claim 2 wherein said one flange is extended to circumscribe said retainer and has an inner circumferentially extending edge spaced closely adjacent the circumferential trace of the shaft member.

UNITED STATES PATENT OFFICE
CERTIFICATE OF CORRECTION

Patent No. 3,601,458          Dated August 24, 1971

Inventor(s) RONALD J. FARRELL, ALLEN KERNS, AND CARL R. ERNSBERGER

It is certified that error appears in the above-identified patent and that said Letters Patent are hereby corrected as shown below:

Column 2, line 12; "0.4800-2X.=0.405 inch." should read --0.4800-2X.0375 = 0.405 inch.--

Signed and sealed this 31st day of October 1972.

(SEAL)
Attest:

EDWARD M. FLETCHER, JR.
Attesting Officer

ROBERT GOTTSCHALK
Commissioner of Patents